P. C. HEWITT.
STARTING AND OPERATING VAPOR ELECTRIC DEVICES.
APPLICATION FILED APR. 25, 1905.
1,110,551.
Patented Sept. 15, 1914.
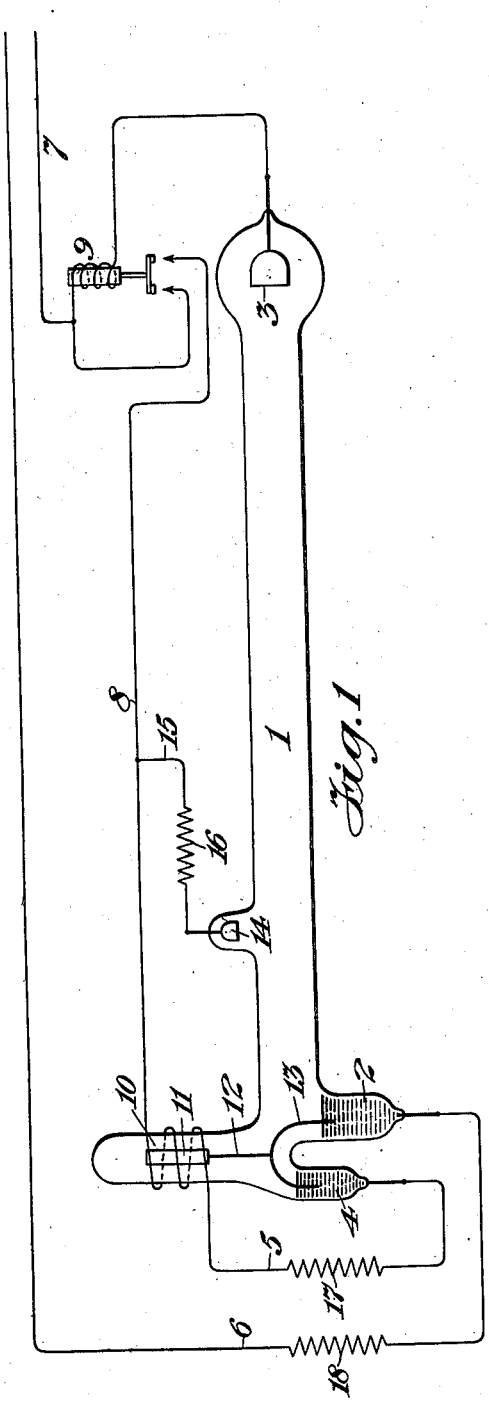
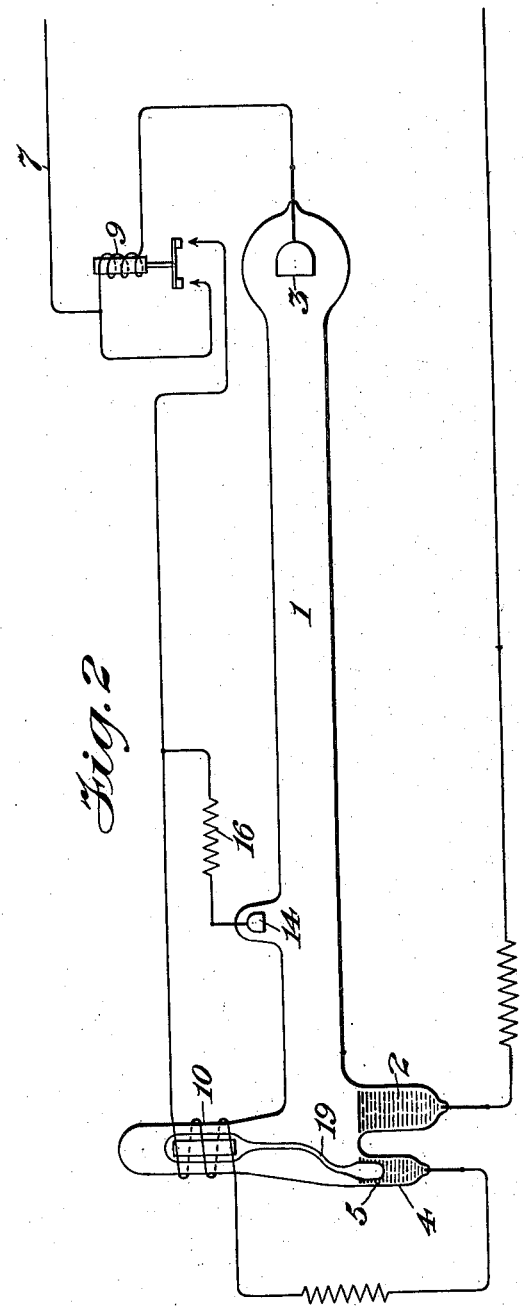

UNITED STATES PATENT OFFICE.

PETER COOPER HEWITT, OF NEW YORK, N. Y., ASSIGNOR, BY MESNE ASSIGNMENTS, TO COOPER HEWITT ELECTRIC COMPANY, OF HOBOKEN, NEW JERSEY, A CORPORATION OF NEW JERSEY.

STARTING AND OPERATING VAPOR ELECTRIC DEVICES.

1,110,551. Specification of Letters Patent. Patented Sept. 15, 1914.

Application filed April 25, 1905. Serial No. 257,309.

*To all whom it may concern:*

Be it known that I, PETER COOPER HEWITT, a citizen of the United States, and resident of New York, county of New York, State of New York, have invented certain new and useful Improvements in Starting and Operating Vapor Electric Devices, of which the following is a specification.

My invention relates to the construction and operation of electric apparatus of the kind now commonly termed vapor electric devices.

The object of the present invention is particularly to provide means for the ready starting of the flow of current through the device. When the so-called negative electrode reluctance to starting has been broken down and a current commences to flow between a given positive conductor and the negative, a second positive conductor may be readily substituted for the first, the current either shifting entirely to the second positive or dividing between the two according to circumstances. Generally speaking, the substitution of one positive for another is more readily accomplished if the second is not very remote from the first. Nevertheless the substitution can take place where the first positive is quite near the negative and the second positive located at a distance therefrom.

My present invention relates more particularly to the automatic shifting from a neighboring positive to a remote positive and more particularly by means of one or more intervening positive electrodes, the current shifting first from the first positive to a neighboring positive and successively to one or more distant positives until it has reached the final working positive.

The invention involves various other features as hereinafter pointed out.

In the accompanying drawings, Figure 1 is an elevation and diagram illustrating one application of the invention; Fig. 2 illustrates a modification.

Referring to the drawings, 1 represents an inclosing chamber of suitable character containing a negative electrode 2, and a main working positive electrode 3. These are shown as located at or near opposite ends of the chamber 1. The former may consist of a small quantity of mercury, and the latter of soft iron, carbon or other suitable material or, in some cases, it may be found advantageous to have it consist of a quantity of mercury. A temporary or starting positive electrode, 4, is shown in Fig. 1, as being located in a branch or projection, 5, of the inclosing chamber.

The main line conductor, 6, leads to the negative electrode, and the positive main line conductor, 7, leads to the working positive electrode 3. A branch circuit, 8, leads from the line 7 to the starting positive 4. A cut-out magnet, 9, is here shown as included in the conductor 7 which serves to interrupt the connections of the conductor 8 when current is flowing to the electrode 3. A coil, 10, is also shown as included in the conductor 8, adapted to operate, 11, which is contained within the container 1. The core 11 carries an arm, 12, which supports a bridge, 13, adapted to dip into the two mercury electrodes 2 and 4, when the core is in the downward position. When current flows through the conductor 8 and thus the coil 10, it leaves the core and thus interposes the bridge between the electrodes 4, and 2, causing current to flow from one to the other electrode. I have found it convenient to inclose such a core and, if desired, also the support 12 in glass or other air-tight material so that gases therefrom may not escape into the chamber 1.

In the drawing, I have also shown another temporary positive electrode 14, located between the electrode 2, and the electrode 3, and this is connected by a conductor, 15, with the conductor 8. A resistance, 16, is shown as inserted in the conductor 15. Likewise a resistance, 17, is shown as being connected in the conductor leading to the electrode 4, and usually it is found advantageous to have a resistance or steadying device, 18, included in the main circuit either in the conductor 6 or 7, leading to the negative electrode.

When the current is turned on a flow of current is started and the coil 10 lifts the bridge 13, starting current through the vapor between the positive electrode 4 and the negative electrode 2. The current will then pass between the electrode 14, and the electrode 2. The presence of the resistance, 16, however, in the conductor leading to the electrode 14, serves to automatically cause the current to shift to the working electrode, 3. When the circuit interrupting device 9 is provided, the connections of the conductor 8, leading to the electrodes 4 and 15, is then automatically interrupted.

The cessation of current flow through the coil 10, will permit the bridge-piece 13, to drop down again into the mercury electrodes 4 and 2 but, owing to the fact that the connections of the conductor 8 are interrupted, there would then be no current flowing through the bridge until the current from the positive electrode 3 has ceased to flow.

In Fig. 2, a modification is shown in which instead of employing a bridge-piece 13, a plunger 19 is employed which serves to raise the level of the mercury in the projection 5, sufficiently to bring the electrode 4 into connection with the electrode 2, for initiating the flow of current. The lifting of the plunger by the action of the coil 10 serves to start the device in the manner already described with reference to Fig. 1.

I claim as my invention:—

The combination in an electric vapor apparatus, of main positive and negative electrodes, a supplemental or starting positive electrode, an intermediate positive electrode, resistances external to the device through which the respective starting and intermediate positive electrodes are connected with the working positive electrode, and an automatic cut-out for severing said connections.

Signed at New York, in the county of New York, and State of New York, this 17th day of April, A. D. 1905.

PETER COOPER HEWITT.

Witnesses:
  Wm. H. Capel,
  George H. Stockbridge.